(12) United States Patent
Buckley et al.

(10) Patent No.: US 7,525,936 B2
(45) Date of Patent: Apr. 28, 2009

(54) APPARATUS, AND ASSOCIATED METHOD, FOR FACILITATING NETWORK SELECTION BY A ROAMING MOBILE NODE

(75) Inventors: Adrian Buckley, Brentwood, CA (US);
Nicholas P. Alfano, Vancouver (CA);
Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 512 days.

(21) Appl. No.: 10/789,405

(22) Filed: Feb. 27, 2004

(65) Prior Publication Data

US 2005/0190716 A1 Sep. 1, 2005

(51) Int. Cl.
*H04L 12/66* (2006.01)
(52) U.S. Cl. .................................... 370/328; 370/395.2
(58) Field of Classification Search ................. 455/422, 455/426, 432, 437, 438, 525, 552, 553, 551, 455/558, 414, 419, 466; 370/328, 395.2
See application file for complete search history.

(56) References Cited

U.S. PATENT DOCUMENTS

| 5,999,811 A | 12/1999 | Molne |
| 6,600,917 B1 | 7/2003 | Maupin |
| 6,826,400 B1 * | 11/2004 | Cashman et al. ............ 455/434 |
| 2002/0023227 A1 * | 2/2002 | Sheymov et al. ............ 713/201 |
| 2002/0087674 A1 | 7/2002 | Zhao et al. |
| 2003/0186695 A1 | 10/2003 | Bridges |
| 2007/0124802 A1 * | 5/2007 | Anton et al. .................... 726/3 |

FOREIGN PATENT DOCUMENTS

EP 0 781 064 A2 6/1997

* cited by examiner

*Primary Examiner*—Sam Bhattacharya (57) ABSTRACT

Apparatus, and an associated method, by which to facilitate operation of a roaming mobile node to perform a packet communication service. When the mobile node roams beyond its home network, detection is made of the available networks in whose coverage area that the mobile node roams together with the communication capabilities of the available networks. A preferred listing stored at a storage element of the mobile node is accessed to determine if any of the available and compatible networks are listed on the preferred listing. If so, selection is made of one of the available and preferred networks. Otherwise, a network not contained in the preferred listing is selected through which to communicate.

20 Claims, 5 Drawing Sheets

| Network ID (11) | | Voice Available (14) | Packet Data Available (15) | Network Available (16) |
|---|---|---|---|---|
| MCCa (12) | MNCa (13) | Yes | No | No (16) |
| MCCa | MNCb | Yes | Yes | Yes (17) |
| MCCa | MNCc | Yes | Yes | Yes |

| Network ID | | Voice Available | Packet Data Available | Packet data service available |
|---|---|---|---|---|
| MCCa | MNCa | Yes | No | |
| MCCa | MNCb | Yes | Yes | Blackberry.net (no) |
| MCCa | MNCc | Yes | Yes | Blackberry.net (Yes) |

APPARATUS, AND ASSOCIATED METHOD, FOR FACILITATING NETWORK SELECTION BY A ROAMING MOBILE NODE

The present invention relates generally to a manner by which to facilitate network selection in a radio communication system to facilitate effectuation of a packet communication service by a mobile node. More particularly, the present invention relates to apparatus, and an associated method, by which to facilitate network selection by a roaming mobile node that roams beyond its own network to permit its operation pursuant to a packet communication service to communicate data by way of a selected radio access network.

Selection of the radio access network through which the roaming mobile node communicates is made at the mobile node. A determination is made of which radio access networks are available and, further, of which of the available radio access networks provide packet data connectivity. A preferred list of radio access networks is maintained at the mobile node. If the mobile node roams into an area encompassed by a radio access network identified in the preferred list and the radio access network provides traffic data connectivity, then selection is made of the radio access network identified on the list. Otherwise, selection is selectably made of another radio access network, not listed on the preferred list, that is available and provides packet data connectivity.

BACKGROUND OF THE INVENTION

Advancements in communication technologies have permitted the development and deployment of many different types of communication systems that permit the effectuation of many different types of communication services. Communication systems are regularly utilized by many users to communicate therethrough pursuant to many varied communication services. Some communication services have become practical necessities of modern society. And, access to appropriate communication systems is a necessity for many.

As technological advancements continue, improved, and new, communication services shall likely become available. In general, the technological advancements provide for more efficient communications, at higher communication rates, or in manners that better provide for successful communications in spite of adverse communication conditions.

Technological advancements include advancements in digital communication techniques. Many modern communication systems utilize digital communication techniques to facilitate communication of data. Various communication advantages are provided through the use of digital communication techniques. Use of digital communication techniques, for example, permit redundancies to be removed from data prior to its communication, thereby permitting improved communication efficiencies. Improved communication efficiencies, in turn, permit data throughput rates of data communicated during operation of the communication system relative to a corresponding communication system that does not make use of digital communication techniques.

A radio communication system is an exemplary type of communication system. Advancements in communication technologies have been implemented in modern radio communication systems that have been developed and deployed. Many modern radio communication systems make use of digital communication techniques that, when implemented, form digital radio communication systems.

Data is communicated during operation of a radio communication system upon radio channels, defined upon a portion of the electromagnetic spectrum. Communication stations operable in a radio communication system operate variously to convert data that is to be communicated into a form capable of communication on the radio communication channel and to detect the data communicated thereon, thereby to permit the recovery of the informational content thereof.

Radio communication systems provide various advantages over their wireline counterparts. Because a wireline connection is not required to interconnect the communication stations of a radio communication system, communications are effectuable between communication stations between which wireline connections cannot easily be formed. And, because the wireline connection is not required to interconnect the communication stations, a radio communication system is amenable for implementation as a mobile communication system. In a mobile communication system, one or more of the communication stations between which data is communicated pursuant to effectuation of a communication service is provided mobility.

An exemplary type of radio communication system is a cellular communication system. A cellular communication system makes use of a plurality of fixed-site base transceiver stations that are deployed at spaced locations throughout an area that is to be encompassed by the communication system. Each base transceiver station defines a coverage area, referred to as a cell. Telephonic communication is effectuated through use of a mobile node that transceives data with a base transceiver station. Through the use of the plurality of base transceivers, positioned at the spaced locations, a base transceiver station is generally positioned in relatively close proximity to a mobile station positioned in an area encompassed by the communication system. Only relatively low-powered signals are required to be communicated between the mobile node and a base transceiver station to effectuate communications therebetween. The same channels are reusable at different base transceiver stations according to a cell reuse pattern.

Cellular communication systems are constructed to be operable in conformity with an operating specification promulgated by a standard-setting regulatory body. Successive generations of operating standards have been promulgated and corresponding successive generations of cellular communication systems have been deployed. A significant portion of the populated area of the world is encompassed by one or more generations of cellular communication systems.

The network infrastructures of more than one generation of cellular communication systems might, for instance, be installed over a common area and be concurrently operable to provide for radio communications with mobile stations operable in the respective communication systems. And, separate networks, operated by separate network operators, of the same generation, might also be installed over the common area, also to be operable concurrently.

A mobile node is authorized to communicate by way of a cellular communication system through purchase of a service subscription to communicate therethrough. Generally, pursuant to the service subscription, the mobile node is associated with a home network. The home network is typically the network that is installed to encompass an area in which the user of the mobile node is anticipated most regularly to be positioned. However, due to the inherent mobility of a mobile node, the user of the mobile node, carrying the mobile node, might roam beyond the coverage area of the home network of the mobile node. When roaming beyond the home network, the mobile node might instead be positioned at a location encompassed by another network, a visited network.

When the mobile node roams beyond its home network, the mobile node is selectably permitted to communicate by way of one or more of the visited networks, depending upon, among other things, whether the mobile node and the visited network operate pursuant to the same operating specification. Also, agreements between operators of the visited and home networks are further determinative of whether the mobile node is able to communicate by way of a particular visited network.

The mobile node might roam into an area encompassed by more than one network such that more than one network is available to a mobile node through which to communicate. A decision is made as to which of the available networks that the mobile node communicates. Conventional mechanisms are used in the decision-making process, typically including use of a defined set of preferred roaming partners. An operator of the home network of the mobile node maintains a list of preferred networks that are to be used through which to communicate when the mobile node roams beyond the home network. Historically, the preferred roaming lists are based upon capability of the visited networks having voice capability pursuant to circuit-switched connectivity.

Increasingly, however, cellular communication systems, and the mobile nodes operable therein, provide for packet communication services. Many new networks, constructed to be operable pursuant to new-generation operating specifications, provide packet connectivity permitting packet data services while, in contrast, some legacy networks provide only circuit-switched connectivity. When packet communication services are to be effectuated by a roaming mobile node, selection of the visited network through which to communicate based upon conventional criteria, i.e., based upon merely the capacity of a visited network to handle voice communications is inadequate to ensure that a packet data communication service shall acceptably be effectuated in that network.

Accordingly, an improved manner by which to select a network through which a roaming mobile node communicates is needed.

It is in light of this background information related to the communication packet-formatted data in a radio communication system that the significant improvements of the present invention have evolved.

SUMMARY OF THE INVENTION

The present invention, accordingly, advantageously provides apparatus, and an associated method, by which to facilitate network selection in a radio communication system to facilitate effectuation of a packet communication service with a mobile node.

Through operation of an embodiment of the present invention, a manner is provided by which to facilitate network selection by a roaming node that roams beyond its home network to permit its operation pursuant to a packet communication service.

The radio access network through which the roaming node communicates is selected at the mobile node. Determination is made at the mobile node of which radio access networks are available and, also, of which of the available radio access networks provide packet data connectivity. A preferred list of radio access networks is maintained at the mobile node. If the mobile node roams into an area encompassed by a radio access network identified in the preferred list and the radio access network provides packet data connectivity, then selection is made of the radio access network identified on the list. Otherwise, selection is made of another radio access network, not listed on the preferred list, but which is available and provides packet data connectivity.

In one aspect of the present invention, a home network is associated with the mobile node. An operator of the home network has affiliations with operators of other networks, or otherwise has a preference that the mobile node communicate by way of selected networks when the mobile node roams beyond its home network. The preferred networks are codified in a preferred network list. The preferred network list is provided to the mobile node, and the mobile node utilizes the preferred list as part of its selection process by which to select a network through which to communicate when roaming beyond its home network.

In one aspect of the present invention, the preferred list is downloaded to the mobile node, either when the mobile node is initially placed into service or during its operation, such as during registration procedures. The preferred roaming list is, once downloaded to the mobile node, stored at a storage element. The contents of the preferred roaming list are accessible during operation of the mobile node. Indexed together with the preferred roaming list are indications of the capabilities exhibited by the entries contained on the list. The network capabilities here indicate whether the networks provide circuit-switched connectivity, packet-switched connectivity, or both packet and circuit-switched connectivities. The preferred list, stored at the mobile node, is dynamically updatable, both to indicate changes in the entries on the list and also to indicate changes to the capabilities of the entries. Additionally, in one implementation, the mobile node monitors broadcasts of signals generated by networks into whose areas that the network roams. The signals broadcast by the networks include, in addition to identifying indicia, indications of their respective communication capabilities. The signals detected by the mobile node are used to update the contents of the preferred roaming list stored thereat When a packet data service is to be performed by the mobile node, the mobile node selects through which network that the communication service is to be effectuated. Determination is first made, based, for instance, upon which of the networks are available, that is, within which of the networks that the mobile node is in reception range. Subsequent to determination of which of the networks are available, the preferred roaming list is accessed to determine whether the available network, or networks, provide capabilities, namely packet data connectivity.

If the available network exhibits the appropriate communication capabilities and is contained on the preferred list, the network is selected and communications are effectuated therethrough. If, however, none of the networks listed in the preferred list are both available and provide the communication capabilities required to effectuate the packet communication service, the mobile node instead makes selection of through which network to communicate based upon the detected signals broadcast by the network in whose coverage area that the mobile node is positioned. Selection is made of a network, if any, that provides packet data connectivity whose signals that the mobile node receives.

Thereby, the selection of a network through which to communicate is based upon availability of the network and whether the network provides packet data connectivity best to facilitate effectuation of the packet data service.

In these and other aspects, therefore, apparatus, and an associated method, is provided for a radio communication system. The radio communication system has a mobile node operable at least to communicate packet data pursuant to a packet communication session by way of a selected network portion of a network part of the radio communication system. The network part has a plurality of network portions. Selection of which of the plurality of network portions forms the selected network portion by way of which the packet data is communicated pursuant to the communication session is facilitated. A storage element is embodied at the mobile node. The storage element selectably contains a listing of a preferred set of network portions associated with the mobile node together with network portion capabilities of individual ones of the network portions, if any, forming the preferred set. A selector is coupled to the storage element. The selector selects the selected network portion by way of which the packet data is communicated. Selection is made by the selector of one of the network portions, if any, identified in the listing contained at the storage element that exhibits network portion capabilities of packet data connectivity. And, if none of the network portions, if any, identified in the listing exhibit packet data connectivity, selection made by the selector selectably is made of another network portion to form the selected network portion by way of which the packet data is communicated.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
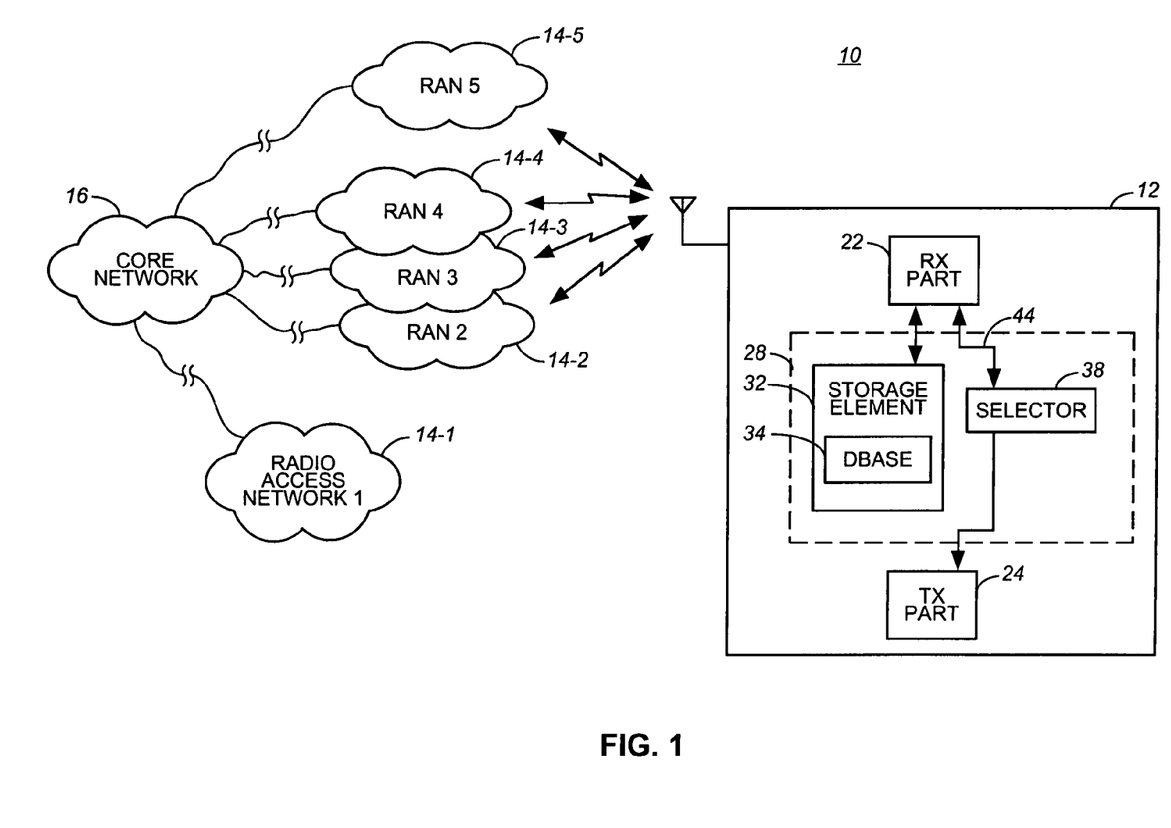
FIG. 1 illustrates a functional block diagram of a radio communication system in which an embodiment of the present invention is operable.

Referring first to FIG. 1, a mobile radio communication system, shown generally at 10, provides for communication of data between a fixed network and a plurality of mobile nodes, of which the mobile node 12 is representative. The mobile nodes are permitted movement throughout a geographical area encompassed by the radio communication system, including, in the exemplary implementation, movement during effectuation of a communication service. The mobile node 12 is operable at least to effectuate a packet communication service.

In the exemplary implementation, at least parts of the communication system are operable, generally, pursuant to the operating protocols and standards set forth in a GSM (Global System for Mobile communications) operating specification. Here, the mobile node is operable, generally, pursuant to the GSM operating specification. And, the mobile node is here GPRS (General Packet Radio Service)-capable or EDGE (Enhanced Data for GSM Evolution)-capable to provide for the effectuation of GPRS or EDGE packet communication services.

While the following description shall describe exemplary operation of the mobile radio communication system in which the mobile node, and at least selected portions of the network, operate pursuant to the GSM operating specification, in other implementations, the mobile node operates in other manners and the at least selected parts of the network of the communication system also operate in other manners. And, description of operation of the communication system, and the mobile node operable therein, can similarly be described with respect to an implementation in which the mobile node operates in conformity with another radio standard.

The network of the radio communication system here includes a plurality of radio access networks 14, here designated at 14-1, 14-2, 14-3, 14-4, and 14-5. The radio access network 14-1 forms a home network of the mobile node 12. Permanent registry information associated with the mobile node is maintained at the home network, such as at a home location register thereof. The home network is typically a network at which the mobile node is most regularly positioned. When the mobile node is located within the coverage area of its home network 14-1, the mobile node communicates by way of its home network.

Due to the inherent mobility of the mobile node, however, the mobile node is not necessarily always positioned within the coverage area of its home network. The mobile node is repositionable in an area encompassed by another network, such as the geographical areas encompassed by the networks 14-2, 14-3, 14-4, and 14-5. The radio access networks 14-2, 14-3, and 14-4 are positioned to have coverage areas that partially overlap one another. The radio access networks 14-2, 14-3, and 14-4 are representative of networks, operated by separate network operators, that are operable over at least partially overlapping coverage areas. And, the radio access network 14-5 is representative of another network that defines another coverage area also in which the mobile node is poositionable when the mobile node roams beyond its home network.

The radio access networks 14-1 through 14-5 are appropriately interconnected, such as by way of a core network 16, or other appropriate communication medium or fabric through which communication paths are formable.

The exemplary mobile node 12 forms a radio transceiver, having a receive part 22 and a transmit part 24. The receive part of the transceiver formed of the mobile node operates to receive data communicated to the mobile node on radio downlink channels defined upon a radio air interface. And, the transmit part of the transceiver formed of the mobile node operates to transmit data upon uplink channels defined upon the radio air interface. When the mobile node is positioned within the coverage area of its home network, the mobile node transceives data by way of the home network. But, when the mobile node roams beyond the coverage area of its home network, the mobile node, to effectuate communications, must communicate by way of another radio access network. While various conventional schemes are used to select through which radio access network that the mobile node communicates when the mobile node roams beyond its home network, the conventional schemes generally utilize a preferred roaming list created by the operator of the home network of the mobile node. Conventionally, the preferred roaming lists are predicated upon circuit-switched connectivity, not upon packet data connectivity. When the communication service to be effectuated by the mobile node forms a packet communication service, utilization of a conventional scheme by which to select the network with which the mobile node communicates is inadequate.

The mobile node includes apparatus 28 of an embodiment of the present invention. The apparatus operates to select, or facilitate selection of, the radio access network through which the mobile node communicates when the mobile node roams beyond the coverage area defined by its own network or otherwise is to communicate by way of a network other than its own network. Selection of with which network that the mobile node communicates, unlike a conventional scheme, takes into account the capability of available networks to provide packet data connectivity.

The apparatus 28 includes a storage element 32. The storage element, in one implementation, is embodied at a SIM (Subscriber Identity Module) module releasably positionable at the mobile node. In other implementations, the storage element 32 is embodied elsewhere, such as an integrated circuit memory integrally formed at the mobile node. Values stored at the storage element define a database 34 that forms a listing that contains entries identifying radio access networks together with their respective communication capabilities. And, the apparatus also includes a selector 38. The selector is coupled to the storage element to permit access by the selector to the listing formed of the database defined at the storage element. The selector is also provided additional information, here by way of the line 44 representative of indications of signals broadcast to the mobile node and detected by the receive part thereof. Indications of the messages are also provided to the storage element to be stored thereat. The selector selects an available radio access network, if any, through which the mobile node shall communicate. Indications provided to the selector indicative of the broadcast of signals to the mobile node and detected at the receive part thereof identify which of the networks are available, viz, in whose coverage areas that the mobile node is positioned. And, access is made to the listings contained in the database, also to identify radio access networks.

In the exemplary implementation, a preferred list of networks is stored at the storage element so that individual entries contained in the listing of preferred networks together with their respective capabilities. During operation of the apparatus, available networks, i.e., networks whose broadcasts are detected by the receive part of the mobile node, are identified together with their capabilities. That is to say, the available networks are identified and, of the available networks, the networks that provide packet data connectivity are further identified. Then, the listing is accessed to determine if any of the networks that are both available and compatible are contained in the listing. If an available and compatible network is also listed in the listing, selection is made from this set. Otherwise, if none of the networks determined to be both available and compatible are listed in the listing, selection is made, not of a network listed in the listing, but of a network that exhibits the appropriate capabilities, here packet data connectivity. Thereby, selection of a network is not limited to those networks that appear in the preferred list downloaded to the mobile node. While preference is given to networks contained on the preferred listing, an alternate network is selectable in the event that none of the networks contained in the preferred listing are both available and provide packet data connectivity.

Figure 2:
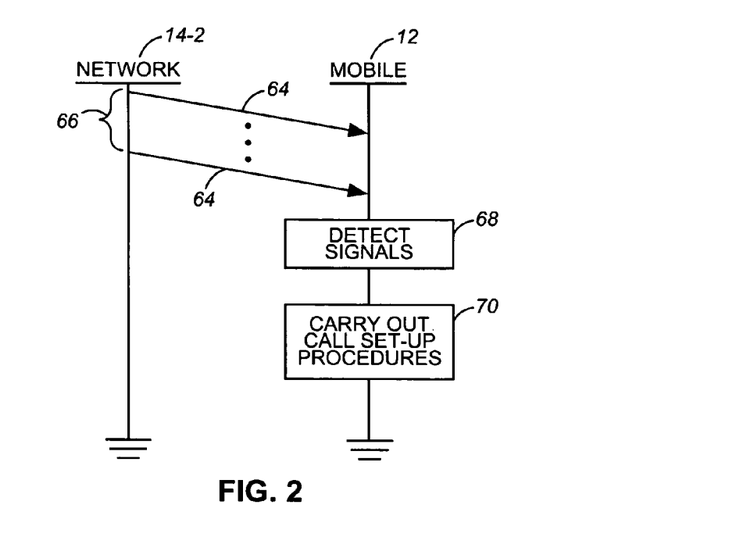
FIG. 2 illustrates a message sequence diagram representative of exemplary signaling generated during operation of the radio communication system shown in FIG. 1.

FIG. 2 illustrates a message sequence diagram, shown generally at 62, representative of signaling generated during operation of the mobile radio communication system shown in FIG. 1. Here, broadcast of signals by a selected radio access network, here radio access network 14-2, are broadcast, indicated by the signals 64. The signals are sent at selected intervals, here periodic intervals at a selected repetition rate 66. When the mobile node is within the coverage area of the network 14-2, the mobile node detects the broadcast signals, indicated by the block 68, and indications of the signals are provided by the receive part of the mobile node and are provided to the apparatus 38 embodied at the mobile node.

The apparatus operates to select the network by way of which the mobile node communicates at least in part responsive to the broadcast information. If, and illustrated in the Figure, the network 14-2 is the network by of which the mobile node communicates, call set-up procedures are carried out, indicated by the block 70 and packet data communication services are effectuated.

Figure 3:
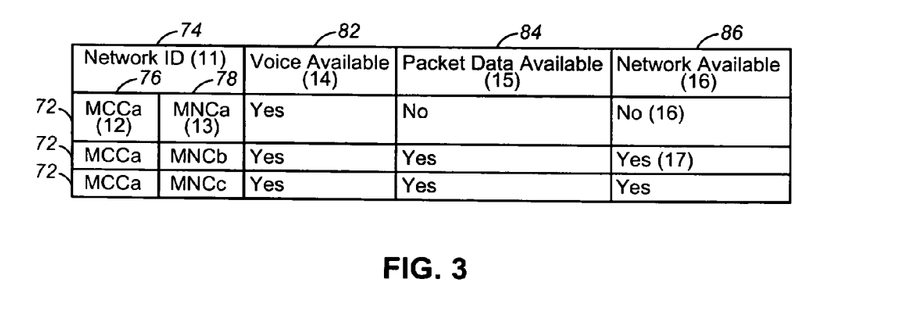
FIG. 3 illustrates a representation of an exemplary listing formed pursuant to an embodiment of the present invention.

FIG. 3 illustrates an exemplary listing formed of the database defined at the storage element 36. Here, the listing is formed of a plurality of entries 72. Each entry identifies a network 74 by a mobile country code (MCC) 76 and a mobile network code (MNC) 78. A suffix identifier, here "a", "b", and "c", identify the commonality of country of the different entries. Communication capabilities of the networks are indicated in the columns 82, 84, and 86. The capabilities of voice connectivity, packet connectivity, and network availability are listed in the respective columns.

Figure 4:
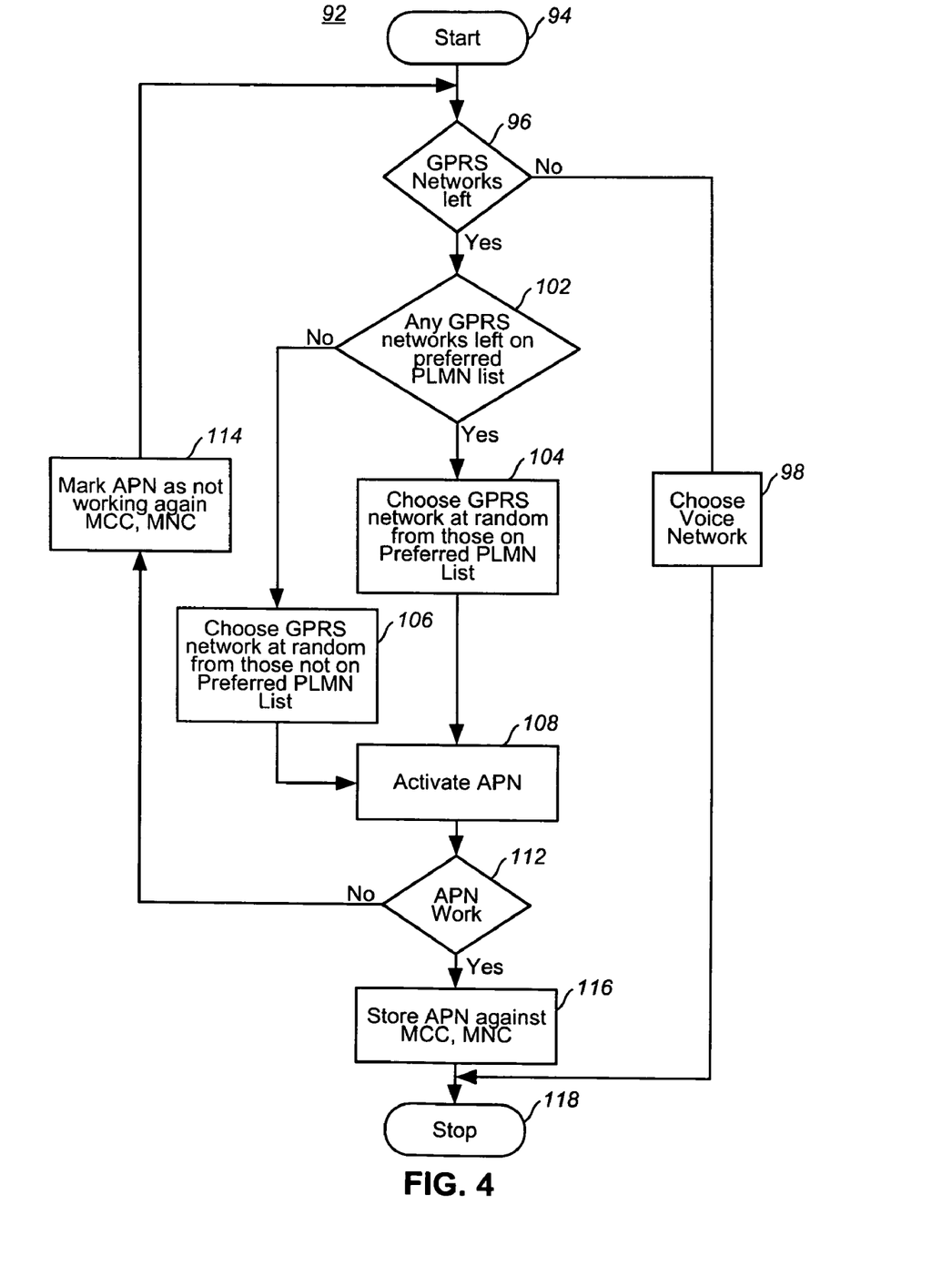
FIG. 4 illustrates a flow diagram representative of exemplary operation of an embodiment of the present invention.

FIG. 4 illustrates a method flow diagram 92 representative of operation of an embodiment of the present invention. Entry into the process flow starts at the start block 94. First, and as indicated by the decision block 96, a determination is made as to whether any of the available networks provide GPRS packet data services. If not, the no branch is taken to the block 98, and a voice network is selected by which to communicate. If, conversely, a GPRS network is detected to be available, the yes branch is taken to the decision block 102.

At the decision block 102, a determination is made as to whether any of the GPRS-capable networks detected to be available are also listed in the preferred listing of networks. If so, the yes branch is taken to the block 104 and a GPRS-capable network of the available networks is selected to be the network through which the mobile node communicates. If more than one network is available, a random, or other, selection of the more than one network is made. If, conversely, none of the available GPRS-capable networks are also contained in the preferred list, the no branch is taken to the block 106. At the block 106, selection of a network is made of the available networks that provide the GPRS capability. Branches are taken from both of the blocks 104 and 106 to the block 108.

At the block 108, the APN (Access Points Name) is activated to attempt packet access to the selected network. Then, at the decision block 112, a determination is made as to whether the access attempt was successful. If not, the no branch is taken to the block 114, and the APN is marked as not working for the identified network and a return is made to the decision block 96. If, conversely, the APN activation was successful, the yes branch is taken to the block 116 and the APN is marked as being a working APN. And, a branch is taken to the stop block 118.

Figure 5:
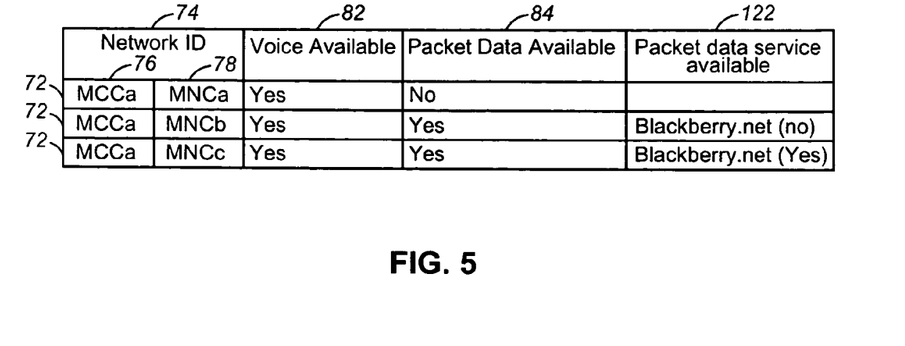
FIG. 5 illustrates a representation of another exemplary listing formed pursuant to an embodiment of the present invention.

FIG. 5 illustrates a listing, again formed of a plurality of entries 72 of preferred networks 74 identified by country and network codes 76 and 78. The columns 82 and 84 indicating voice and packet data connectivities associated with the networks are also shown. And, here, further, a column 122 indicates whether the APN used in the activation attempt was successful and associated success of the packet data service responsive thereto.

Figure 6:
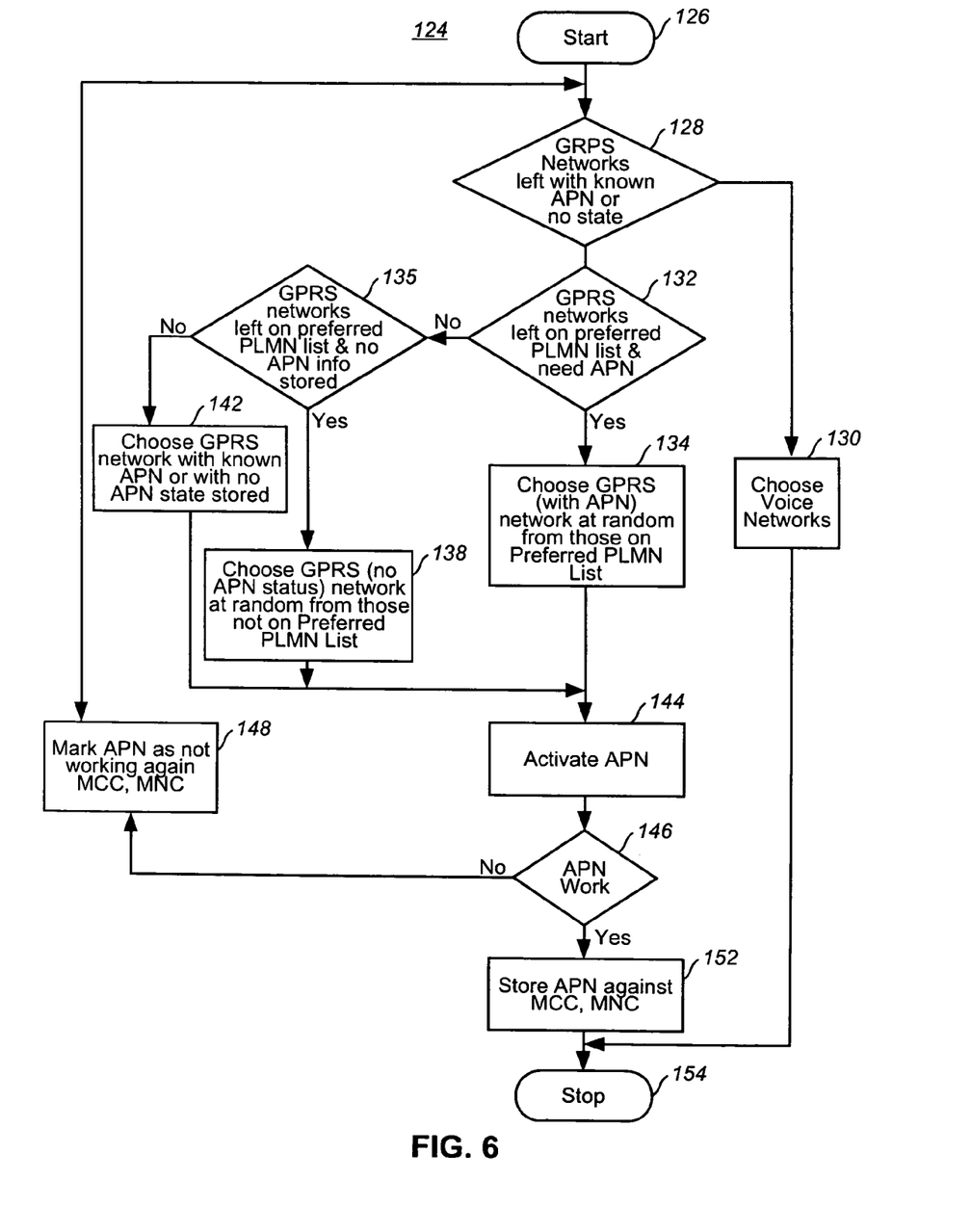
FIG. 6 illustrates another flow diagram, also representative of exemplary operation of an embodiment of the present invention.

FIG. 6 illustrates another method flow diagram, here shown generally at 124. Entry into the process commences with the start block 126. First, a determination is made at the decision block 128 as to whether any GPRS networks are detected with a known APN or no state. If not, the no branch is taken to the block 130, and a voice network is chosen to which to communicate.

If, the yes branch is taken from the decision block 128, a further determination is made at the decision block 132 as to whether any of GPRS capable network remains on the preferred list and also needs an APN. If so, the yes branch is taken to the block 134. At the block 134, a network that is GPRS capable with an APN is selected that is listed on the preferred listing.

If at the decision block 132, a determination is made that none of the GPRS compatible networks are listed on the preferred listing and need an APN, then the no branch is taken to the decision block 135. At the decision block 135, determination is made as to whether any GPRS compatible networks remain on the preferred listing and no APN information is stored thereat. If so, the yes branch is taken to the block 138, and an available, GPRS compatible network is selected of those that are not listed on the preferred listing. And, if the no branch is taken from the decision block 135, an available GPRS compatible network is selected, indicated at the block 142 with a known APN or with no APN state that is stored. Branches are taken from the block 134, 138, and 142 to the block 144. At the block 144, the APN is activated. And, at the decision block 146, a determination is made whether packet connectivity using the APN was successful. If not, the no branch is taken to the block 148 and the APN is marked in the listing as not working. If the packet connectivity was successful using the APN, the yes branch is taken to the block 152 and the APN is stored against the network ID in the listing. A stop block 154 terminates the process.

Because selection of the network through which the mobile node communicates is not limited to those networks listed in a preferred listing, improved communications are provided in a radio communication system of a roaming mobile node that roams beyond its own network.

The previous descriptions are of preferred examples for implementing the invention, and the scope of the invention should not necessarily be limited by this description. The scope of the present invention is defined by the following claims.

What is claimed is:

1. Apparatus for a radio communication system having a mobile node operable at least to communicate packet data pursuant to a packet communication session by way of a selected network portion of a network part of the radio communication system, the network part having a plurality of network portions, said apparatus for facilitating selection by said mobile node of which of the plurality of network portions packet data is communicated by the mobile node pursuant to the communication session, said apparatus comprising:

a storage element embodied at the mobile node, said storage element selectably containing a listing of a preferred set of network portions associated with the mobile node together with packet data communication capabilities of individual ones of the network portions, if any, forming the preferred set, the packet data communication capabilities contained in the listing being updateable by the mobile node in response to unsuccessful attempts made by the mobile node to access packet data connectivity of the network portions listed in said listing, that the mobile node is authorized to attempt to access; and a selector embodied at the mobile node and coupled to said storage element, said selector for selecting the selected network portion by way of which the packet data is communicated, selection made by said selector of one of the network portions, if any, identified in the listing contained at said storage element that exhibits packet data connectivity, and if none of the network portions, identified in the listing exhibit packet data connectivity, selection made by said selector of another network portion not identified in the listing which exhibits packet data connectivity, in order to form a selected network portion by way of which the packet data is communicated from the mobile node.

2. The apparatus of claim 1 wherein the plurality of network portions comprises a home network associated with the mobile node, the home network maintaining a preferred roaming list identifying preferred network portions by way of which the mobile node is to communicate when roaming beyond the home network, and wherein the listing of the preferred set contained at said storage element comprises the preferred roaming list.

3. The apparatus of claim 1 wherein each network portion of the plurality of network portions is identified by a network identifier and wherein the listing contained at said storage element identifies each network portion of the preferred set by the network identifier associated therewith.

4. The apparatus of claim 3 wherein the network identifier identifying each of the network portions of the preferred set stored at said storage element comprises a country code and a network code, the country code identifying a country in which the network portion identified therefrom is located and the network code uniquely associated with the network portion identified therefrom.

5. The apparatus of claim 1 wherein the network part of the radio communication system is coupled to the mobile node by way of a radio air interface and wherein the listing contained at said storage element is formed of information downloaded thereto by way of the radio air interface.

6. The apparatus of claim 5 wherein the listing contained at said storage element is updateable.

7. The apparatus of claim 6 wherein the packet data communication capabilities of the individual ones of the network portions comprise identification of whether the individual ones of the network portions are within communication range of the mobile node to be available thereto by way of which to communicate, availability of the network portions is updateable.

8. The apparatus of claim 1 wherein the packet data communication capabilities of the individual ones of the network portions comprise identification of whether the individual ones of the network portions provide voice data connectivity and of whether the individual ones of the network portions provide the packet data connectivity.

9. The apparatus of claim 1 wherein the network portions of the plurality of network portions each broadcast signals containing identification information and wherein said apparatus further comprises a detector for detecting the signals containing the identification information.

10. The apparatus of claim 9 wherein selection made by said selector selectably of another network portion is of a network portion of which the signals containing the identification information is detected by said detector.

11. The apparatus of claim 10 wherein said detector detects signals containing the identification information broadcast by a first of the network portions and signals containing the identification information by at least a second of the network portions and wherein selection made by said selector selectably of the another network portion is one of the first and at least second network portions, respectively.

12. The apparatus of claim 11 further comprising a packet-connection attemptor adapted to receive indications of selection made by said selector, said packet-connection attemptor for attempting to form a packet-connection with the selected network portion.

13. The apparatus of claim 12 wherein the packet data communicated pursuant to the packet communication session is communicated to effectuate a packet data communication service with an entity identified by an access point name, and wherein said packet-connection attemptor attempts to form the packet connection with the entity identified by the access point name.

14. The apparatus of claim 13 wherein the listing contained at said storage element further indexes the access point name together with the network portion with which the access point name is associated.

15. A method of communicating in a radio communication system having a mobile node operable at least to communicate packet data pursuant to a packet communication session by way of a selected network portion of a network part of the radio communication system, the network part having a plurality of network portions, said method for facilitating selection of which of the plurality of network portions forms the selected network portion by way of which the packet data is communicated pursuant to the communication session, said method comprising:

forming a listing at the mobile node of a preferred set of network portions associated with the mobile node together with packet data communication capabilities of individual ones of the network portions, if any, forming the preferred set;

selecting the selected network portion by way of which the packet data is communicated, selection of one of the network portions, if any, identified in the listing, formed during said operation of forming the listing, that exhibits packet data communication capabilities of packet data connectivity; and, if none of the network portions, if any, identified in the listing exhibit packet data connectivity, then selecting another network portion, not identified in the listing, that exhibits packet data connectivity, in order to form a selected network portion by way of which the packet data is communicated form the mobile node; and updating the packet data communication capabilities contained in the listing by the mobile node, responsive to unsuccessful attempts made by the mobile node to access packet data connectivity services provided by the network-portions in said listing and that the mobile node is authorized to attempt to access.

16. The method of claim 15 wherein the plurality of network portions comprises a home network associated with the mobile node, the home network maintaining a roaming list identifying preferred network portions by way of which the mobile node is to communicate when roaming beyond the home network, and wherein the listing formed during said operation of forming, of the preferred set comprises the preferred roaming list.

17. The method of claim 15 further comprising the operation of dynamically maintaining the listing formed during said operation of forming.

18. The method of claim 15 further comprising the operations of broadcasting signals from at least selected ones of the network portions and detecting, at the mobile node, the signals broadcast during said operation of broadcasting.

19. The method of claim 18 wherein selection made during said operation of selectably selecting of the another network portion is of a network portion of which the signals broadcast during said operation of broadcasting and detected during said operation of detecting.

20. The method of claim 19 further comprising the operation of attempting to form a packet connection with the selected network portion.

* * * * *